United States Patent
Hoffmann et al.

(10) Patent No.: US 10,377,222 B2
(45) Date of Patent: Aug. 13, 2019

(54) DRIVE DEVICE FOR A MOTOR VEHICLE AND METHOD FOR OPERATING A DRIVE DEVICE

(71) Applicant: AUDI AG, Ingolstadt (DE)

(72) Inventors: Thomas Hoffmann, Riedenburg (DE); Markus Störmer, Berching (DE)

(73) Assignee: AUDI AG, Ingolstadt (DE)

(*) Notice: Subject to any disclaimer, the term of this patent is extended or adjusted under 35 U.S.C. 154(b) by 51 days.

(21) Appl. No.: 15/729,022

(22) Filed: Oct. 10, 2017

(65) Prior Publication Data
US 2018/0099554 A1  Apr. 12, 2018

(30) Foreign Application Priority Data

Oct. 10, 2016 (DE) .................. 10 2016 219 617

(51) Int. Cl.
*B60K 6/44* (2007.10)
*B60K 6/365* (2007.10)
(Continued)

(52) U.S. Cl.
CPC ............ *B60K 6/44* (2013.01); *B60K 6/365* (2013.01); *B60K 6/445* (2013.01); *B60K 6/48* (2013.01); *B60K 6/547* (2013.01); *B60K 25/02* (2013.01); *B60K 25/06* (2013.01); *B60W 10/02* (2013.01); *B60W 10/06* (2013.01); *B60W 10/08* (2013.01); *B60W 10/30* (2013.01); *B60W 20/00* (2013.01); *B60W 20/10* (2013.01);
(Continued)

(58) Field of Classification Search
CPC .............. F16H 2200/2007; F16H 3/724; F16H 3/727; Y02T 10/6239; B60K 6/44; B60K 6/365; B60K 2006/4816; B60K 2006/4825; B60K 6/445; B60K 6/547; B60Y 2200/92
See application file for complete search history.

(56) References Cited

U.S. PATENT DOCUMENTS 5,890,468 A   4/1999  Ozawa
8,876,656 B2  11/2014 Erjawetz et al.
(Continued)

FOREIGN PATENT DOCUMENTS

DE        195 81 495 T1   1/1997
DE   10 2006 037 577 A1   2/2008
(Continued)

OTHER PUBLICATIONS

Machine translation of DE102012025368, retrieved from www.espacenet.com (Year: 2019).*
(Continued)

*Primary Examiner* — Stacey A Fluhart
(74) *Attorney, Agent, or Firm* — Maier & Maier, PLLC

(57) ABSTRACT

A drive device for a motor vehicle, comprising a first drive assembly, a second drive assembly, and an epicyclic gear train coupled to the second drive assembly, wherein the second drive assembly can be coupled to a driven shaft of the drive device via the epicyclic gear train and to the first drive assembly by means of a shift clutch. It is hereby provided that a secondary drive shaft of an at least one secondary drive of the drive device having a secondary assembly is coupled to the epicyclic gear train. The invention further relates to a method for operating a drive device for a motor vehicle.

10 Claims, 1 Drawing Sheet

(51) Int. Cl.
*B60K 6/48* (2007.10)
*F16H 3/54* (2006.01)
*F16H 3/72* (2006.01)
*F16H 37/06* (2006.01)
*B60K 6/445* (2007.10)
*B60K 6/547* (2007.10)
*B60K 25/02* (2006.01)
*B60K 25/06* (2006.01)
*B60W 10/30* (2006.01)
*B60W 20/00* (2016.01)
*B60W 10/02* (2006.01)
*B60W 10/06* (2006.01)
*B60W 10/08* (2006.01)
*B60W 30/188* (2012.01)
*B60W 20/10* (2016.01)

(52) U.S. Cl.
CPC ........... *B60W 30/1886* (2013.01); *F16H 3/54* (2013.01); *F16H 3/724* (2013.01); *F16H 3/727* (2013.01); *F16H 37/06* (2013.01); *B60K 2006/4816* (2013.01); *B60K 2025/024* (2013.01); *B60Y 2200/92* (2013.01); *B60Y 2400/73* (2013.01); *Y02T 10/6239* (2013.01); *Y02T 10/6286* (2013.01); *Y10S 903/911* (2013.01)

(56) References Cited

U.S. PATENT DOCUMENTS

| | | | |
|---|---|---|---|
| 8,893,489 B2 | 11/2014 | Donohue et al. | |
| 10,065,633 B2 * | 9/2018 | Banshoya | B60W 10/12 |
| 2008/0096711 A1 | 4/2008 | Smith et al. | |
| 2018/0194214 A1 * | 7/2018 | Oba | B60K 6/445 |

FOREIGN PATENT DOCUMENTS

| | | | | |
|---|---|---|---|---|
| DE | 102012025368 A1 * | 7/2014 | | B60K 6/365 |
| DE | 11 2011 105 719 T5 | 8/2014 | | |
| DE | 102014009866 A1 | 1/2016 | | |
| EP | 2466168 A1 | 6/2012 | | |
| EP | 2655116 B1 | 7/2015 | | |
| FR | 2861335 B1 | 2/2006 | | |

OTHER PUBLICATIONS

European Search Report dated Feb. 20, 2018, in connection with corresponding EP Application No. 17193732.9 (9 pgs.).

Search Report dated May 31, 2017 of corresponding German application No. 10 2016 219 617.0; 10 pgs.

* cited by examiner

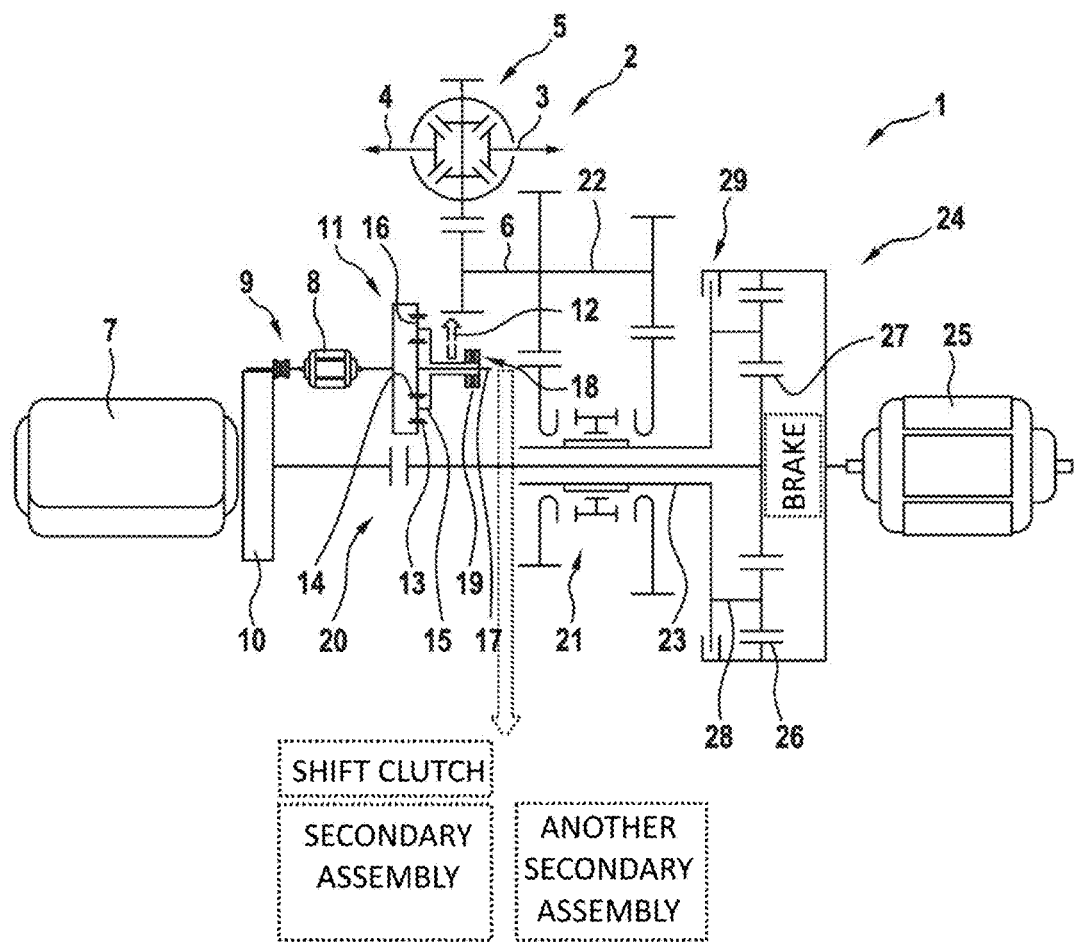

000# DRIVE DEVICE FOR A MOTOR VEHICLE AND METHOD FOR OPERATING A DRIVE DEVICE

FIELD

The invention relates to a drive device for a motor vehicle, comprising a first drive assembly, a second drive assembly, and an epicyclic gear train coupled to the second drive assembly, wherein the second drive assembly can be coupled to a driven shaft of the drive device via the epicyclic gear train and/or can be coupled to the first drive assembly by means of a shift clutch. The invention further relates to a method for operating a drive device for a motor vehicle.

BACKGROUND

The drive device serves for driving the motor vehicle and, in this regard, therefore, for supplying a torque directed at driving the motor vehicle. The drive device supplies the torque, which may also be referred to as a drive torque, to the driven shaft of the drive device. For example, the driven shaft is operatively connected rigidly and/or permanently to a wheel axle of the motor vehicle or to at least one wheel of the motor vehicle that can be associated with the wheel axle. The operative connection between the driven shaft and the wheel axle or the wheel can be produced via a transmission, such as, for example, a differential transmission, in particular a center differential transmission, and/or an axle differential transmission.

The drive device provides a plurality of drive assemblies, namely, at least the first drive assembly and the second drive assembly. The two drive assemblies can basically be designed in any way. For example, the drive assemblies are of different type, so that in this respect, the drive device is designed as a hybrid drive device. In this case, the first drive assembly can be present, for example, in the form of an internal combustion engine and the second drive assembly can be designed as an electric motor.

The two drive assemblies, namely, the first drive assembly and the second drive assembly, can be coupled to each other by means of the shift clutch. This means that, by use of the shift clutch, an operative connection, in particular a direct operative connection, can be produced between the first drive assembly and the second drive assembly. The direct operative connection is understood to mean, in particular, a coupling of the first drive assembly and the second drive assembly that is not made through the epicyclic gear train. When the shift clutch is closed, the coupling is preferably rigid.

The second drive assembly can be coupled to the driven shaft additionally or alternatively via the epicyclic gear train. The epicyclic gear train may also be referred to as planet gear train and is preferably designed as an epicyclic toothed gear train. The operative connection lies between the second drive assembly and the driven shaft, provided it is produced via the epicyclic gear train. For this purpose, for example, the second drive assembly is connected to a transmission element of the epicyclic gear train, whereas the driven shaft is connected to a different transmission element of the epicyclic gear train.

SUMMARY

The object of the invention is to propose a drive device for a motor vehicle that, when compared to known drive devices, offers advantages and, in particular, is characterized by a high energy efficiency as well as a great flexibility.

It is hereby proposed that a secondary drive shaft of a secondary drive having at least one secondary assembly of the drive device is coupled to the epicyclic gear train.

Fundamentally, the secondary drive should be integrated in the drive device in such a way that said secondary drive or the at least one secondary assembly can be operated in an especially energy-efficient manner, while, at the same time, the drive device can be engaged in a flexible manner, in particular in a large number of operating states of the motor vehicle. In particular, it should be possible to create an interaction between at least one of the drive assemblies, in particular both drive assemblies, and the secondary drive. This means that the secondary drive or the secondary drive shaft of the secondary drive can be operated, preferably optionally, by means of the first drive assembly, by means of the second drive assembly, and/or by means of kinetic energy of the motor vehicle. The latter is realized by a linkage of the secondary drive or of the secondary drive shaft to the driven shaft of the drive device, said linkage being independent of the first drive assembly.

It is hereby provided that the secondary drive shaft of the secondary drive is coupled to the epicyclic gear train. The secondary drive in this regard is operatively connected to at least one transmission element of the epicyclic gear train, in particular rigidly and/or permanently. This means that the secondary drive or the secondary drive shaft always has the same speed as the transmission element to which it is coupled. Preferably, the secondary drive shaft is coupled to the second drive assembly via the epicyclic gear train, in particular permanently, or at least can be coupled to it. For this purpose, the second drive assembly is coupled to another transmission element of the epicyclic gear train. By means of the second drive assembly, it is thereby possible, for example, to regulate the speed of the secondary drive shaft. For example, the second drive assembly is hereby coupled to the driven shaft via the epicyclic gear train, in particular permanently, or at least can be so coupled. For this purpose, the driven shaft is connected to another transmission element of the epicyclic gear train, so that, therefore, the second drive assembly, the secondary drive shaft, and the driven shaft are coupled to different transmission elements of the epicyclic gear train.

Additionally or alternatively, the secondary drive shaft can be operatively connected to the first drive assembly via the epicyclic gear train and the shift clutch. Accordingly, the secondary drive shaft can be driven by use of the first drive assembly, preferably by use of both the first drive assembly and the second drive assembly. When, in addition, the epicyclic gear train is coupled to or at least can be coupled to the driven shaft of the drive device, which is preferably the case, it is possible, in addition, for the kinetic energy of the motor vehicle to be employed for driving the secondary drive shaft and consequently the secondary assembly.

Such a construction of the drive device makes possible an extremely flexible use. Thus, for example, it can be provided that the secondary drive shaft is driven by means of the second drive assembly and/or a torque can be imposed on the driven shaft of the drive device in order to drive or brake the motor vehicle, for example. In addition, it is possible by use of the second drive assembly to control and/or to regulate the speed of the secondary drive shaft, in particular to a target speed. Furthermore, it is also possible in the case of slow driving speeds of the motor vehicle, that is, at so-called creep speeds, at which, for example, a driving speed of less than 10 km/h or less than 6 km/h exists, to charge an energy storage system by use of an electric motor, such as, for example, the second drive assembly or another drive assembly.

Given an appropriate design, it can also be provided that the first drive assembly is started by use of the second drive assembly, so that, therefore, the second drive assembly is present as a starter for the first drive assembly. If, besides the first drive assembly and the second drive assembly, the additional drive assembly is provided, then the latter can be relieved, at least temporarily, by use of the second drive assembly. It is also possible to increase, at least to a small degree, the continuous output of the drive device.

Furthermore, given an appropriate design, there ensues the advantage that the driving of the secondary drive shaft brings about a braking of the motor vehicle by using the kinetic energy of the motor vehicle. This is advantageous when a recuperative braking of the motor vehicle is not possible by use of the second drive assembly and/or the additional drive assembly, because, for example, the energy storage system cannot take up any more energy and, in particular, because it is completely full. Overall, the integration of the secondary drive in the drive device creates a highly integrated drive device, which can be operated in an especially energy-efficient manner in numerous operating states of the motor vehicle.

Another embodiment of the invention provides that the first drive assembly can be coupled to the driven shaft via the second drive assembly by means of the shift clutch and/or that the secondary assembly can be coupled to the secondary drive shaft by means of a shift clutch of the secondary assembly. It is therefore provided that the first drive assembly can be coupled to the driven shaft via the second drive assembly by means of the shift clutch. For example, a drive shaft of the second drive assembly can be coupled to a drive shaft of the first drive assembly in a rotation-resistant manner, so that, when the shift clutch is closed, the drive shafts of the first drive assembly and the second drive assembly have essentially the same speed. Obviously, it can hereby be provided that, in the operative connection between the first drive assembly and the second drive assembly, a vibration damping device, such as, for example, a dual mass flywheel or the like, is present. This is the case, in particular, when the first drive assembly is present in the form of the internal combustion engine.

More preferably, it is provided that the first drive assembly can be coupled to the driven shaft via the second drive assembly by means of the shift clutch and the epicyclic gear train can be coupled to the driven shaft. For this purpose, for example, the epicyclic gear train or a transmission element of the epicyclic gear train is coupled rigidly and/or permanently to the second drive assembly, which can be coupled, in turn, to the first drive assembly by means of the shift clutch.

Additionally or alternatively, the secondary assembly can be coupled to the secondary drive shaft by means of the shift clutch of the secondary assembly. The shift clutch of the secondary assembly in this regard is present in the operative connection between the secondary assembly and the secondary drive shaft. By use of the shift clutch of the secondary assembly, the secondary assembly can optionally be coupled to or decoupled from the secondary drive shaft. This means that the secondary assembly can be taken out of operation by decoupling it from the secondary drive shaft, even when the secondary drive shaft is being driven, that is, when the secondary drive shaft has a speed that is different from zero.

If a plurality of secondary assemblies are provided, they can be coupled jointly to the secondary drive shaft via the shift clutch of the secondary assembly, so that the shift clutch of the secondary assembly is present as a joint shift clutch of the secondary assembly. However, it is preferred when a plurality of secondary assemblies, in particular all secondary assemblies, are each assigned to such a shift clutch of the secondary assembly, so that, in each case, a plurality of the secondary assemblies or each of the secondary assemblies is optionally coupled to or decoupled from the secondary drive shaft.

Another preferred embodiment of the invention provides that the epicyclic gear train has a first transmission element, a second transmission element, and a third transmission element, wherein the first transmission element and the second transmission element are coupled to each other via at least one planet gear, which is rotatably mounted on the third transmission element, wherein the first drive assembly, the second drive assembly, and the secondary drive shaft are each coupled to one of the transmission elements. As transmission elements, the epicyclic gear train usually has a ring gear, a sun gear, and a planet gear cage, wherein the planet gear is rotatably mounted at the latter. Via the planet gear and consequently the planet gear cage, the first transmission element and the second transmission element are coupled to each other, in particular permanently. Preferably, for this purpose, teeth of the planet gear mesh with teeth of the ring gear and teeth of the sun gear.

The first drive assembly, the second drive assembly, and the secondary drive shaft are then each coupled to one of the transmission elements. Preferably, the first drive assembly and the second drive assembly are coupled to the same transmission element and only coupled to the same transmission element. However, they can also be coupled to different transmission elements. The secondary drive shaft can preferably be coupled to at least one other transmission element. In particular, the secondary drive shaft is coupled permanently to one of the transmission elements and can be coupled to another of the transmission elements, wherein the two transmission elements to which the secondary drive shaft is coupled or can be coupled are different from the transmission element that is coupled to the first drive assembly and the second drive assembly.

Another preferred embodiment of the invention provides that the second drive assembly is coupled to the first transmission element, which is formed as a ring gear, the secondary drive shaft is coupled to the second transmission element, which is formed as a sun gear, and/or the driven shaft is coupled to the third transmission element, which is formed as a planet gear cage. Reference has already been made above to such an embodiment of the epicyclic gear train, comprising the ring gear, the sun gear, and the planet gear cage. It then becomes clear that the second drive assembly, the secondary drive shaft, and the driven shaft are coupled to different transmission elements, preferably rigidly and/or permanently. Preferably, the first drive assembly can be coupled to the first transmission element via the second drive assembly by use of the shift clutch.

Another preferred embodiment of the invention provides that at least two of the transmission elements, in particular the sun gear and the planet gear cage, can be coupled to each other by means of a locking clutch. Via the locking clutch, a rigid coupling of the two transmission elements to each other is possible. When the locking clutch is opened, the transmission elements are decoupled from each other, whereas, when the locking clutch is closed, they are connected to each other rigidly, that is, in a rotationally resistant manner. By use of the locking clutch, it is possible in this regard to lock the epicyclic gear train. If the two transmission elements are coupled to each other by means of the locking clutch, then the epicyclic gear train operates in so-called locked revolution or direct drive, in which the transmission elements have the same speed. The locking clutch, for example, can be designed in the form of a shiftable clutch, in particular a friction clutch, or as an overrunning clutch. The latter locks the two transmission elements in one direction of rotation with respect to each other, whereas, in the opposite direction of rotation, it releases them or decouples them from each other.

Another embodiment of the invention provides that at least one of the transmission elements can be braked by means of a brake. The brake can be provided additionally or alternatively to the above-described locking clutch. The brake serves for braking at least one of the transmission elements opposite to a casing of the epicyclic gear train or of the drive device. By use of the brake, in this regard it is possible to reduce the speed of the transmission element, in particular down to zero, so that the transmission element can be locked by use of the brake. Obviously, however, it can be provided that the brake provides not only a complete locking of the transmission element, but, moreover, makes possible a braking in steps. This preferably occurs in such a way that, by use of the brake, the actual speed of the transmission element is adjusted to a target speed and, in particular, controlled or regulated to a target speed.

An enhancement of the invention provides that the first drive assembly can be coupled to a change gear transmission by way of another shift clutch, in particular with circumvention of the epicyclic gear train, wherein an output shaft of the change gear transmission is coupled to the driven shaft or forms the driven shaft. The additional shift clutch is present in the form of a releasable clutch, by means of which the operative connection between the first drive assembly and the change gear transmission is optionally engaged or disengaged. When the additional shift clutch is completely closed, the first drive assembly or its drive shaft is preferably coupled rigidly to the change gear transmission or to an input shaft of the change gear transmission. The additional shift clutch is designed, for example, as a starting clutch. Alternatively, it may be present as a dog clutch, a friction clutch, or as an overrunning clutch. It can be a component of a transmission, in particular of a change gear transmission.

The input shaft is connected or can be connected to the output shaft of the change gear transmission via at least one gear set, in particular a toothed gear set. The change gear transmission makes it possible to shift to a drive gear that is chosen from a plurality or large number of possible drive gears. In this regard, it is possible by use of the change gear transmission to adjust different gear ratios between the drive assembly or the additional shift clutch, on the one hand, and the driven shaft, on the other hand. The output shaft of the change gear transmission is preferably coupled, in particular rigidly and/or permanently, to the driven shaft of the drive device. Alternatively, however, it can be provided that the output shaft itself represents the driven shaft or forms the driven shaft.

The coupling of the first drive assembly to the change gear transmission via the additional shift clutch is preferably provided with circumvention of the epicyclic gear train. When the additional shift clutch is closed, torque is transmitted between the first drive assembly and the change gear transmission or vice versa and thus not via the epicyclic gear train, but rather bypasses it. This makes possible an operation of the drive device in which the first drive assembly drives the driven shaft with circumvention of the epicyclic gear train and consequently of the second drive assembly.

It can hereby be provided that the driven shaft is additionally driven via the epicyclic gear train by use of the second drive assembly or the second drive assembly is driven via the epicyclic gear train by use of kinetic energy of the motor vehicle or the rotational movement of the driven shaft. Furthermore, it is possible to couple the first drive assembly to the driven shaft both via the additional shift clutch and via the shift clutch—and in this regard, via the epicyclic gear train or the second drive assembly and the epicyclic gear train. The torque supplied by the first drive assembly in this regard, is transmitted to the driven shaft in a parallel manner via the additional shift clutch, on the one hand, and via the shift clutch, on the other hand.

Another embodiment of the invention provides that another drive assembly can be coupled to the first drive assembly by means of the additional shift clutch, in particular via another epicyclic gear train. The additional drive assembly is provided in this case in addition to the first drive assembly and the second drive assembly. Preferably, the additional drive assembly exists as an electric motor. The second drive assembly and the additional drive assembly can be identical or different in design. In the first case, the drive assemblies have, for example, the same rated power and, in the latter case, they have a different rated power.

The first drive assembly and the additional drive assembly can be coupled to each other via the additional shift clutch. When the additional shift clutch is opened, the two drive assemblies are in this case completely decoupled from each other, whereas, when the additional shift clutch is closed and, in particular, completely closed, they are operatively connected to each other.

In this case, the operative connection can exist, in particular, via the additional epicyclic gear train. The additional epicyclic gear train has, in analogy to the epicyclic gear train, a first transmission element, a second transmission element, and a third transmission element, wherein the first transmission element and the second transmission element are coupled to each other via at least one planet gear mounted rotatably at the third transmission element. The additional epicyclic gear train can basically be designed analogously to the already described epicyclic gear train, so that reference is made to the above statements.

Preferably, the first drive assembly and the additional drive assembly are coupled to different transmission elements of the additional epicyclic gear train. Preferably, the additional drive assembly is coupled rigidly and/or permanently to the additional epicyclic gear train, whereas the first drive assembly is coupled to the additional epicyclic gear train or the corresponding transmission element via the additional shift clutch.

The additional epicyclic gear train is designed, for example, to be shiftable. For this purpose, in analogy to the epicyclic gear train, it has a locking clutch. The locking clutch serves, for example, to couple the first transmission element, which is constructed as a ring gear, to the third transmission element, which is constructed as a planet gear cage, so that, in this case as well, it is possible to create a locked revolution or direct drive. Preferably, the first drive assembly can be coupled to the second transmission element, which is constructed as a sun gear, and the second drive assembly can be coupled to the ring gear rigidly and/or permanently. The change gear transmission or its input shaft is coupled to the planet gear cage of the additional epicyclic gear train, preferably likewise rigidly and/or permanently.

Finally, in the scope of another embodiment of the invention, it is possible to provide that another secondary assembly can be coupled to the secondary drive shaft, in particular with a gear ratio that is different from a gear ratio existing between the secondary assembly and the secondary drive shaft. Reference to this has already been made above. In addition to the secondary assembly, the additional secondary assembly can be present. Both the secondary assembly and the additional secondary assembly can each be coupled to or decoupled from the secondary drive shaft. In this case, the gear ratio that is created between the secondary drive shaft and the additional secondary assembly is different from the gear ratio between the secondary drive shaft and the secondary assembly. Alternatively, it is obviously possible for the same gear ratio to exist.

The invention further relates to a method for operating a drive device for a motor vehicle, in particular a drive device according to the above statements, comprising a first drive assembly, a second drive assembly, and an epicyclic gear train coupled to the second drive assembly, wherein the second drive assembly can be coupled to a driven shaft of the drive device via the epicyclic gear train and/or to the first drive assembly by means of a shift clutch. It is hereby provided that a secondary drive shaft of an at least one secondary drive of the drive device, which has at least one secondary assembly, is coupled to the epicyclic gear train.

Reference has already been made to the advantages of such an embodiment of the drive device or of such an approach. Both the drive device and the method for the operation thereof can be further developed in accordance with the above statements, so that reference in this regard is made to these statements.

More preferably, it is provided that, by means of the second drive assembly, the speed of the secondary drive shaft is regulated. For this purpose, the second drive assembly is preferably decoupled from the first drive assembly or the shift clutch is opened and, in particular, completely opened. Furthermore, the locking clutch—if provided—is opened, so that the transmission elements are released with respect to each other and hence are not coupled to each other. For example, it is then provided that the secondary drive shaft is coupled to the driven shaft and, correspondingly—in the event that the motor vehicle is in motion—is driven using kinetic energy of the motor vehicle. Obviously, however, the approach described can also find use when the motor vehicle is at a standstill.

When the locking clutch is opened, the speed of the secondary drive shaft is adjusted depending on the speed of the driven shaft and the speed of the second drive assembly. Accordingly, it is provided that the speed of the second drive assembly is chosen and adjusted in such a way that the speed of the secondary drive shaft corresponds to a target speed regardless of the speed of the driven shaft. As a result of this, it is possible, for example, to keep constant or to adjust and, in particular, to regulate the speed of the secondary drive shaft to the target speed by means of the second drive assembly, in particular also when the speed of the driven shaft is changed.

When the driven shaft is at a standstill, the entire power applied to the secondary drive shaft is then supplied by means of the second drive assembly. The higher the speed of the driven shaft, the higher is the fraction of power that is supplied by the driven shaft and applied to the secondary drive shaft—when the speed of the secondary drive shaft remains the same. Conversely, the fraction supplied by the second drive assembly is, of course, smaller.

BRIEF DESCRIPTION OF THE DRAWING

The invention will be discussed in detail below on the basis of the exemplary embodiments illustrated in the drawing, without any limitation of the invention thereby occurring.

FIG. 1 shows a schematic illustration of a drive device for a motor vehicle.

DETAILED DESCRIPTION OF THE DRAWING

FIG. 1 shows a schematic illustration of a drive device 1 for a motor vehicle, which is not illustrated here in more detail. The drive device 1 serves for driving a wheel axle 2 of the motor vehicle, which has two subaxles 3 and 4, which are operatively connected via a transmission 5, in particular an axle differential transmission, to a driven shaft 6 of the drive device 1. Each of the subaxles 3 and 4 is preferably associated with at least one wheel of the motor vehicle, which is not illustrated here, or is connected to it rigidly and/or permanently.

The drive device 1 has a first drive assembly 7 and a second drive assembly 8. The two drive assemblies 7 and 8 are optionally coupled or decoupled by means of a shift clutch 9. It can be provided that a vibration damping device 10 is provided in the operative connection between the first drive assembly 7 and the shift clutch 9, so that, when the shift clutch 9 is closed, the operative connection between the drive assemblies 7 and 8 also exists via this vibration damping device 10.

The second drive assembly 8 can be coupled to or is coupled to the driven shaft 6 of the drive device 1 via an epicyclic gear train 11, in particular permanently. The operative connection between the epicyclic gear train 11 and the driven shaft 6 required for this purpose is indicated solely by the arrow 12.

The epicyclic gear train 11 has a first transmission element 13, a second transmission element 14, and a third transmission element 15. The first transmission element 13 is designed as a ring gear, the second transmission element 14 as a sun gear, and the third transmission element 15 as a planet gear cage. Mounted rotatably at the third transmission element 15 is at least one epicyclic gear 16, which may be referred to also as a planet gear. In the exemplary embodiment illustrated here, two planet gears 16 are provided. Via the at least one planet gear 16, an operative connection between the first transmission element 13 and the second transmission element 14 is produced. For this purpose, for example, teeth of the planet gear 16 mesh both with teeth of the first transmission element 13 and with teeth of the second transmission element 14.

The second drive assembly 8 is preferably coupled to the first transmission element 13, in particular rigidly and/or permanently. This means that the first drive assembly 7 can be coupled directly to the first transmission element 13 by means of the shift clutch 9 and hence not via the epicyclic gear train 11. The second transmission element 14 is coupled to a secondary drive shaft 17 of a secondary drive 18, preferably rigidly and/or permanently. In contrast, the third transmission element 15 is coupled to the driven shaft 6 via the operative connection according to the arrow 12, preferably likewise rigidly and/or permanently.

A locking clutch 19 can be associated with the epicyclic gear train 11. By means of said locking clutch, the second transmission element 14 and the third transmission element 15 can be locked in a rotationally resistant manner with respect to each other. The secondary drive 18 has at least one secondary assembly, which is not illustrated here in detail but is shown schematically. This secondary assembly is coupled to the secondary drive shaft 17, preferably rigidly and/or permanently, or can be coupled to it by means of, for example, a shift clutch of the secondary assembly, also shown schematically in the provided drawing. This makes it possible optionally to couple the secondary assembly to or to decouple it from the secondary drive shaft, so that the secondary assembly is optionally driven or not driven. As previously noted, it is possible to provide that another secondary assembly may be provided, and further contemplated that a brake may be provided; each of these features is shown schematically as well.

Furthermore, the drive device 1 has another shift clutch 20, via which it can be coupled to a change gear transmission 21, in particular with circumvention of the epicyclic gear train 11. An output shaft 22 of the change gear transmission 21 is coupled to the driven shaft 6 or forms it at least in part. The operative connection between the first drive assembly 7 and the change gear transmission 21 or an input shaft 23 of the change gear transmission 21 exists via another epicyclic gear train 24 when the additional shift clutch 20 is at least partially closed. Via this additional epicyclic gear train 24, it is possible, in addition, to couple another drive assembly 25 to the first drive assembly 7 and/or to the driven shaft 6 or to the change gear transmission 21 or else to decouple it therefrom.

The additional epicyclic gear train 24 has, in analogy to the epicyclic gear train 11 described above, a first transmission element 26, a second transmission element 27, and a third transmission element 28. Said gear transmission elements are constructed in accordance with the transmission elements 13, 14, and 15, so that reference is made to the respective statements. Preferably, the first transmission element 26 is coupled to the additional drive assembly 25, in particular rigidly and/or permanently. In contrast, the second transmission element 27 can be coupled to the first drive assembly 7 via the additional shift clutch 20.

The third transmission element 28 is coupled to the driven shaft 6 via the change gear transmission 21 or at least can be coupled to it. For this purpose, for example, the third transmission element 28 is coupled to the input shaft 23 of the change gear transmission 21, in particular rigidly and/or permanently. Associated with the additional epicyclic gear train 24 is another locking clutch 29. By means of said locking clutch, the first transmission element 26 can be locked with respect to the third transmission element 28; that is, the transmission elements 26 and 28 are connected to each other in a rotationally resistant manner. As a result of this, it is possible to adjust different gear ratios.

The drive device 1 described here makes possible an especially energy-efficient operation of the secondary drive 18 or of the entire drive device 1. For this purpose, the secondary drive 18 is integrated into the drive device 1. An operation of the secondary drive 18 independently of the first drive assembly 7 and of the additional drive assembly 25 is also possible by means of the second drive assembly 8. However, the second drive assembly 8 can also be employed to influence the driven shaft 6 and/or the first drive assembly 7, such as, for example, for braking or accelerating the motor vehicle.

Preferably, the second drive assembly 8 and the additional drive assembly 25 are designed differently from each other. In particular, the rated power of the second drive assembly 8 is markedly less than that of the additional drive assembly 25. For example, the rated power of the second drive assembly 8 is at most 50%, at most 40%, at most 30%, at most 25%, at most 20%, at most 15%, or at most 10% of the rated power of the additional drive assembly 25.

More preferably, it is provided that the speed of the secondary drive shaft 17 can be regulated by means of the second drive assembly 8. For this purpose, the second drive assembly 8 is preferably decoupled from the first drive assembly 7 or the shift clutch 9 is opened and, in particular, completely opened. Furthermore, the locking clutch 19 is opened, so that the transmission elements 14 and 15 are released with respect to each other; that is, they are not coupled to each other. For example, it is then provided that the secondary drive shaft 17 is coupled to the driven shaft 6 and, correspondingly—in the event that the motor vehicle is in motion—driven using kinetic energy of the motor vehicle. Obviously, however, the described procedure can also find use when the motor vehicle is at a standstill.

When the locking clutch 19 is opened, the speed of the secondary drive shaft 17 is adjusted depending on the speed of the driven shaft 6 and the speed of the second drive assembly 8. Accordingly, it is provided that the speed of the second drive assembly 8 is chosen and adjusted in such a way that the speed of the secondary drive shaft 17 corresponds to a target speed regardless of the speed of the driven shaft 6. As a result, for example, the speed of the secondary drive shaft 17 can be kept constant or adjusted and, in particular, regulated to the target speed by means of the second drive assembly 8, in particular also when the speed of the driven shaft 6 is changed.

When the driven shaft 6 is at a standstill, the entire power applied at the secondary drive shaft 17 is then supplied by means of the second drive assembly 8. The higher the speed of the driven shaft 6, the higher is then the fraction of the power supplied by the driven shaft 6 and applied to the secondary drive shaft 17—given a constant speed of the secondary drive shaft 17. Conversely, the fraction supplied by the second drive assembly 8 is, of course, smaller.

Additionally or alternatively, it can be provided that the driven shaft 6 can be coupled to the first drive assembly 7 via the epicyclic gear train 11, in particular in a rotationally resistant manner. For this purpose, for example, the shift clutch 9 and the locking clutch 19 are closed and, in particular, completely closed. The shift clutch 20 is hereby preferably opened, even though the coupling of the driven shaft 6 to the first drive assembly 7 can be made via the additional epicyclic gear train 11, even when the shift clutch 20 is closed, in particular for locking of the driven shaft 6.

In this way, it is possible, for example, to supply a thrust torque of the first drive assembly 7 at the driven shaft 6, in particular for braking of the driven shaft 6 and consequently of the motor vehicle. For example, this procedure can find application when the second drive assembly 8 cannot be operated in recuperative mode, in particular on account of a full energy storage system. The energy storage system normally serves for intervening storage of the electric energy supplied by the second drive assembly 8 in recuperative mode. However, if the energy storage system is completely full or has a state of charge that is greater than a maximum state of charge, then the first drive assembly 7 is intended to be employed in the described way for braking of the driven shaft 6.

The invention claimed is:

1. A drive device for a motor vehicle, comprising:
a first drive assembly, a second drive assembly, and an epicyclic gear train coupled to the second drive assembly, wherein the second drive assembly is coupled to a driven shaft of the drive device via the epicyclic gear train and is removably coupled to the first drive assembly by a shift clutch, and a secondary drive shaft of at least one secondary drive of the drive device is coupled to the epicyclic gear train;

wherein the first drive assembly is removably coupled to a change gear transmission via another shift clutch, wherein an output shaft of the change gear transmission is coupled to the driven shaft or formed as the driven shaft.

2. The drive device according to claim 1, wherein the epicyclic gear train has a first transmission element, a second transmission element, and a third transmission element, wherein the first transmission element and the second transmission element are coupled to each other via at least one planet gear that is rotatably mounted at the third transmission element, wherein the first drive assembly, the second drive assembly, and the secondary drive shaft are each coupled to one of the transmission elements.

3. The drive device according to claim 2, wherein the second drive assembly is coupled to the first transmission element, which is a ring gear, the secondary drive shaft is coupled to the second transmission element, which is a sun gear, and the driven shaft is coupled to the third transmission element, which is a planet gear cage.

4. The drive device according to claim 3, wherein at least two of the transmission elements are configured to be coupled to each other by a locking clutch.

5. The drive device according to claim 4, wherein the at least two transmission elements that are configured to be coupled to one another by the locking clutch are the sun gear and the planet gear cage.

6. The drive device according to claim 2, wherein at least one of the transmission elements is configured to be braked by a brake.

7. The drive device according to claim 1, wherein the first drive assembly is coupled to the change gear transmission via another shift clutch with circumvention of the epicyclic gear train.

8. The drive device according to claim 1, wherein another drive assembly is configured to be coupled to the first drive assembly by the additional shift clutch.

9. The drive device according to claim 8, wherein the another drive assembly is configured to be coupled to the first drive assembly by the additional shift clutch via another epicyclic gear train.

10. A method for operating a drive device for a motor vehicle, the drive device comprising:
a first drive assembly, a second drive assembly, and an epicyclic gear train that is coupled to the second drive assembly, wherein the second drive assembly is coupled to a driven shaft of the drive device via the epicyclic gear train and is removably coupled to the first drive assembly by a shift clutch, wherein a secondary drive shaft is coupled to the epicyclic gear train;
wherein the first drive assembly is removably coupled to a change gear transmission via another shift clutch, wherein an output shaft of the change gear transmission is coupled to the driven shaft or formed as the driven shaft;
wherein the method comprises:
starting the second drive assembly; and
starting the first drive assembly using the second drive assembly.

* * * * *